US008305632B2

(12) United States Patent
Johnson et al.

(10) Patent No.: US 8,305,632 B2
(45) Date of Patent: Nov. 6, 2012

(54) AUTOMATED BATCH PROCESSING OF DOCUMENT IN A MULTIFUNCTION PRINTER SYSTEM

(75) Inventors: Alexander C. Johnson, Portland, OR (US); Scott W. Nelson, Beaverton, OR (US); Hal A. Porter, Portland, OR (US); Joshua R. Poulson, Ridgefield, WA (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 11/762,467

(22) Filed: Jun. 13, 2007

(65) Prior Publication Data
US 2008/0309988 A1 Dec. 18, 2008

(51) Int. Cl.
*H04N 1/00* (2006.01)
(52) U.S. Cl. ........................................ 358/1.6
(58) Field of Classification Search .............. 358/1.6, 358/400, 462, 474
See application file for complete search history.

(56) References Cited

U.S. PATENT DOCUMENTS

| 6,208,436 | B1* | 3/2001 | Cunningham | 358/474 |
|---|---|---|---|---|
| 7,830,537 | B2* | 11/2010 | Beadle et al. | 358/1.14 |
| 2003/0200265 | A1* | 10/2003 | Henry | 709/206 |
| 2004/0184075 | A1* | 9/2004 | Hayashi et al. | 358/1.15 |
| 2004/0218226 | A1* | 11/2004 | Antognini et al. | 358/402 |
| 2006/0044949 | A1* | 3/2006 | Ferlitsch | 369/30.01 |
| 2006/0267970 | A1* | 11/2006 | Minakuchi | 345/204 |
| 2007/0139724 | A1* | 6/2007 | Hutter | 358/464 |
| 2007/0139725 | A1* | 6/2007 | Hutter | 358/464 |

* cited by examiner

*Primary Examiner* — Benny Q Tieu
*Assistant Examiner* — Jeremiah Bryar
(74) *Attorney, Agent, or Firm* — Yudell Isidore Ng Russell PLLC (57) ABSTRACT

A Method of batch processing a group of hardcopy documents scans a stack of documents. Each document in the stack has a cover sheet is placed thereon. The method performs optical character recognition on each of the cover sheets in the stack. The method performs an operation on each of the documents in the stack in accordance with instructions on the cover sheet on each document. Examples of operations that may be performed include printing the document, sending the document by fax to a recipient, sending an image file of the document by email to a recipient, and the like.

20 Claims, 6 Drawing Sheets

AUTOMATED BATCH PROCESSING OF DOCUMENT IN A MULTIFUNCTION PRINTER SYSTEM

BACKGROUND OF THE INVENTION

1. Technical Field

The present invention relates generally to the field of multifunction printers, and more particularly to a system and method that uses optical character recognition to enable a multifunction printer to do automated batch processing.

2. Description of the Related Art

Multifunction printers, also known as all-in-one-printers, have become very popular. A multifunction printer enables a user to scan, copy, print, and fax documents. Some multifunction printers include sheet feeders that allow multipage documents to be automatically scanned or copied. Additionally, some multifunction printers include optical character recognition (OCR) software that enables the multifunction printer, among other things, to convert a scanned document to an editable file. Currently, multifunction printers have not leveraged their capacities to enable them to perform automated batch processing of multiple documents.

SUMMARY OF THE INVENTION

Embodiments of the present invention provide methods of and systems for batch processing a group of hardcopy documents. In one embodiment of a method according to the present invention, a cover sheet is placed on each of the documents of the group. The documents with the cover sheets placed thereon are assembled into a stack. Then, an embodiment of a system according to the present invention scans the stack. The system performs optical character recognition on each of the cover sheets in the stack. The system performs an operation on each of the documents in the stack in accordance with instructions on the cover sheet on each document. Examples of operations that may be performed include printing the document, sending the document by fax to a recipient, sending an image file of the document by email to a recipient, and the like.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
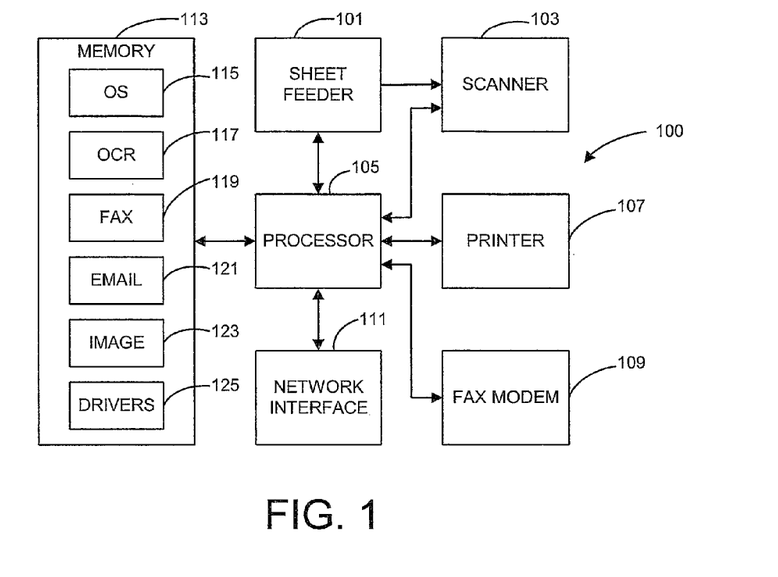
FIG. 1 is a block diagram of an embodiment of a system according to the present invention.

Referring now to the drawings and first to FIG. 1, a multifunction printer is designated generally by the numeral 100. Multifunction printer 100 includes a sheet feeder 101 arranged to feed sheets of paper to a scanner 103. Scanner 103 is coupled to a processor 105. Processor 105 is coupled to send instructions to and receive status messages from Sheet feeder 101 processor 105 is coupled to a printer 107, a fax modem 109, and a network interface 111. Processor 105 is also coupled to the memory 113. Memory 113 contains a plurality of programs used by processor 105 to perform its functions. The programs include an operating system (OS) 115, and optical character recognition (OCR) program 117, a fax program 119, and e-mail program 121, an image program 123, and various device drivers 125. An example of an image program 123 is Adobe™ Acrobat™. The foregoing components of multifunction printer 100 are preferably integrated together and housed as a unitary device.

Embodiments of the present invention use the system of multifunction printer 100 to perform batch processing of hardcopy documents. As will be explained in detail hereinafter, a cover sheet according to the present invention is placed on each document to be processed. The cover sheet identifies the process to be performed and provides sufficient information for multifunction printer 100 to perform the process without further human intervention. The documents with the cover sheets placed thereon are assembled into a stack that is fed to scanner 103 by sheet feeder 100.

Figure 2:
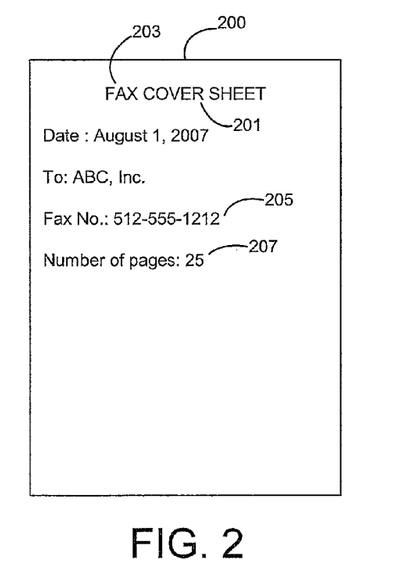
FIG. 2 is an illustration of an embodiment of a fax cover sheet according to the present invention.

FIG. 2 illustrates an embodiment of a fax cover sheet 200 according to the present invention. Fax cover sheet 200 may be a printed or handwritten document. Fax cover sheet 200 includes indicia 201 that identifies it as a cover sheet and indicia 203 that identifies its associated operation as fax. Fax cover sheet 200 includes a fax number 205 and a number of pages 207. In the embodiment of FIG. 2, the number of pages includes fax cover sheet 200. Fax cover sheet 200 may include other information well known to those skilled in the art.

Figure 3:
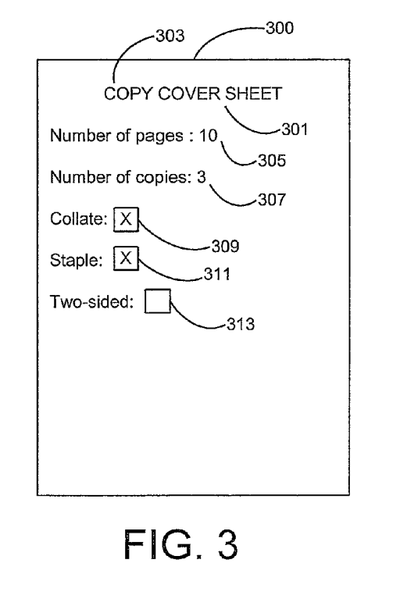
FIG. 3 is an illustration of an embodiment of a copy cover sheet according to the present invention.

FIG. 3 illustrates an embodiment of a copy cover sheet 300. Copy cover sheet 300 includes indicia 301 that identifies it as a cover sheet and indicia 303 that identifies its associated operation as copy. Copy cover sheet 300 includes information that instructs multifunction printer 100 to perform a copy job on a document covered by copy cover sheet 300. The information on copy cover sheet includes the number of pages 305 to be copied and the number of copies 307 to be made. Copy cover sheet 300 also includes further processing instructions, such as collate 309, staple 311, and two-sided 313. Copy features such as collate, staple, and two-sided copying may be selected by marking boxes as shown in FIG. 3.

Figure 4:
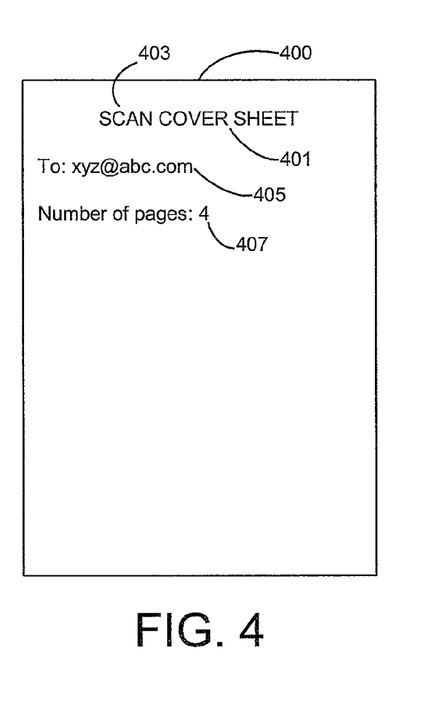
FIG. 4 is an illustration of an embodiment of a scan cover sheet according to the present invention.

FIG. 4 illustrates an embodiment of a scan cover sheet 400. Scan cover sheet 400 includes cover sheet indicia 401 and scan indicia 403. Scan cover sheet 400 includes an e-mail address 405 of a recipient and a number of pages 407.

Figure 5:
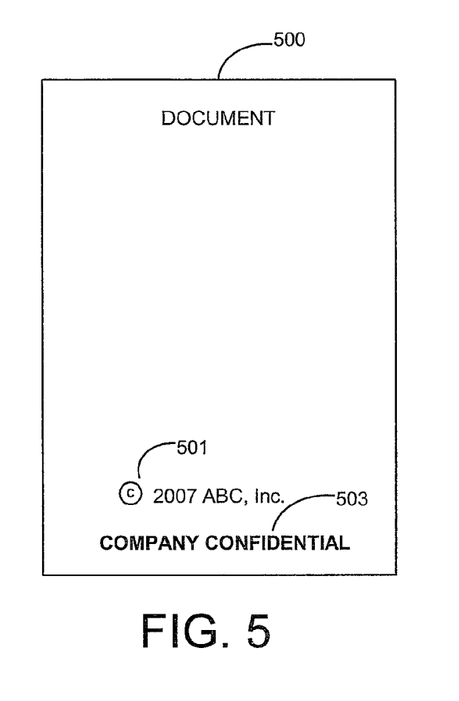
FIG. 5 is an illustration of an embodiment of a generic document according to the present invention.

FIG. 5 illustrates a generic document 500. Document 500 may include a copyright notice 501 and/or a security legend 503. A copyright notice includes the letter c with a circle around it, as shown in FIG. 5, or the word copyright. Examples of security legends include such words as CONFI- DENTIAL, PROPRIETARY, SECRET, DO NOT COPY, EXPORT LICENSE REQUIRED, etc. As will be explained in detail hereinafter, embodiments of the present invention may flag for review copyrighted, proprietary, or otherwise sensitive information.

Figure 6:
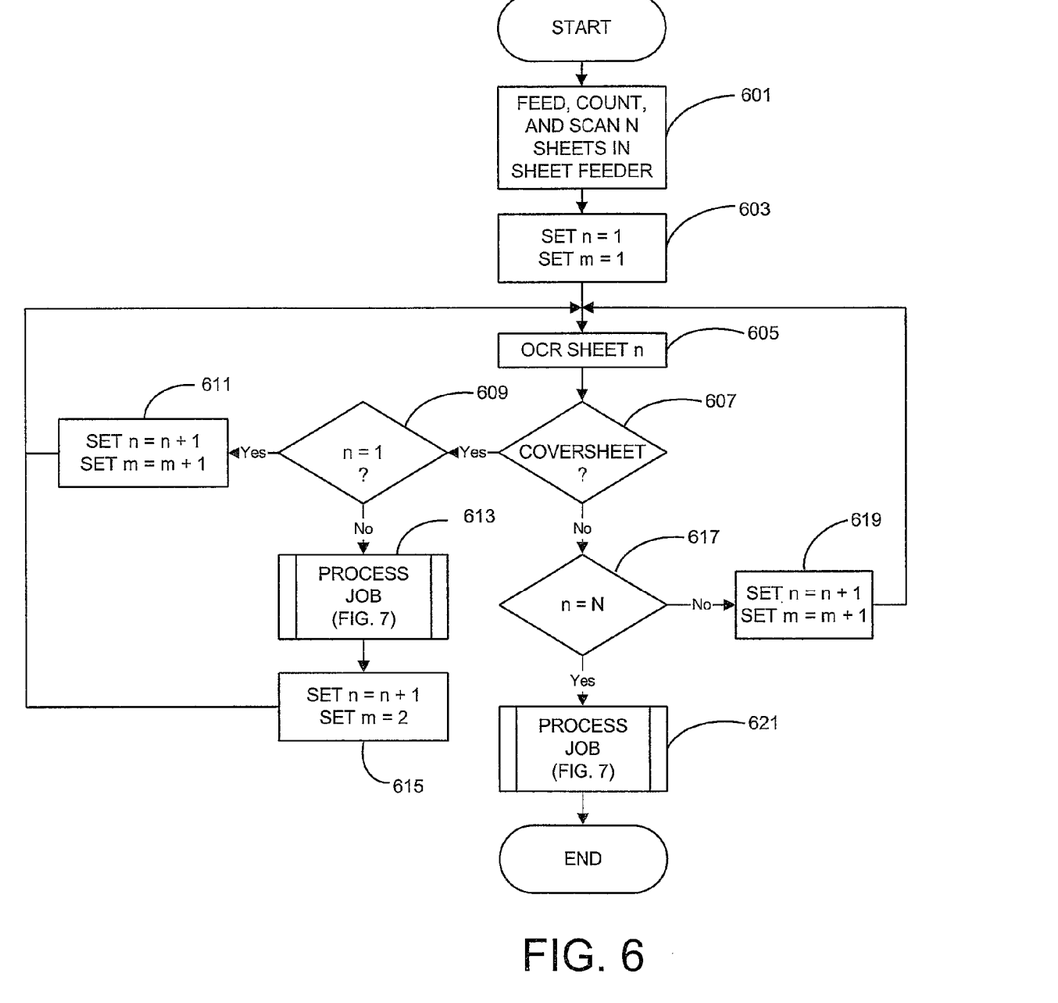
FIG. 6 is flow chart of an embodiment of processing according to the present invention.

Referring now to FIG. 6, there is illustrated a flow chart of an embodiment of processing according to the present invention. A multifunction printer according to the present invention feeds, counts, and scans N sheets of paper in its sheet feeder, as indicated at block 601. The multifunction printer sets an index n equal to one, where n is the number of the sheet in the batch, and an index m equal to one, where m is the number of the page in the job, at block 603. Then, the multifunction printer performs OCR on sheet n, as indicated at block 605. The multifunction printer determines, at decision block 607, if sheet n is a cover sheet. In the embodiment of the invention illustrated, cover sheets are identified by the indicia COVER SHEET. Other cover sheet indicating indicia may be used as would be apparent to one skilled in the art. If, as determined at decision block 607, sheet n is a cover sheet, the multifunction printer determines, at decision block 609, if index n is equal to one, which indicates that the cover sheet is the covers the first job in the batch. If so, the multifunction printer sets index n equal to n plus 1 and the index m equal to m plus one, at block 611, and returns to block 605. If, as determined at decision block 609, index n is not equal to one, which indicates the end of a job, the multifunction printer processes the prior job (i.e. pages 1 to m minus one) in accordance with its cover sheet, is indicated generally at block 613 and described in detail with reference to FIG. 7. Then, the multifunction printer sets index n equal to n plus 1 and index m equal to two, at block 615, and returns to block 605.

Referring again to decision block 607, if sheet n is not a cover sheet, the multifunction printer determines, at decision block 617, if index in is equal the number sheets N in the batch. If not, the multifunction printer sets index n equal to n plus 1 and the index m equal to m plus one, at block 619, and returns to block 605. If index n is equal to N, which means sheet n is the last sheet of the last job of the batch, the multifunction printer processes the job, as indicated at block 621, and processing ends. In alternative embodiments, the multifunction printer may determine the number of pages in each document from the number of pages indicia on the cover sheet.

Figure 7:
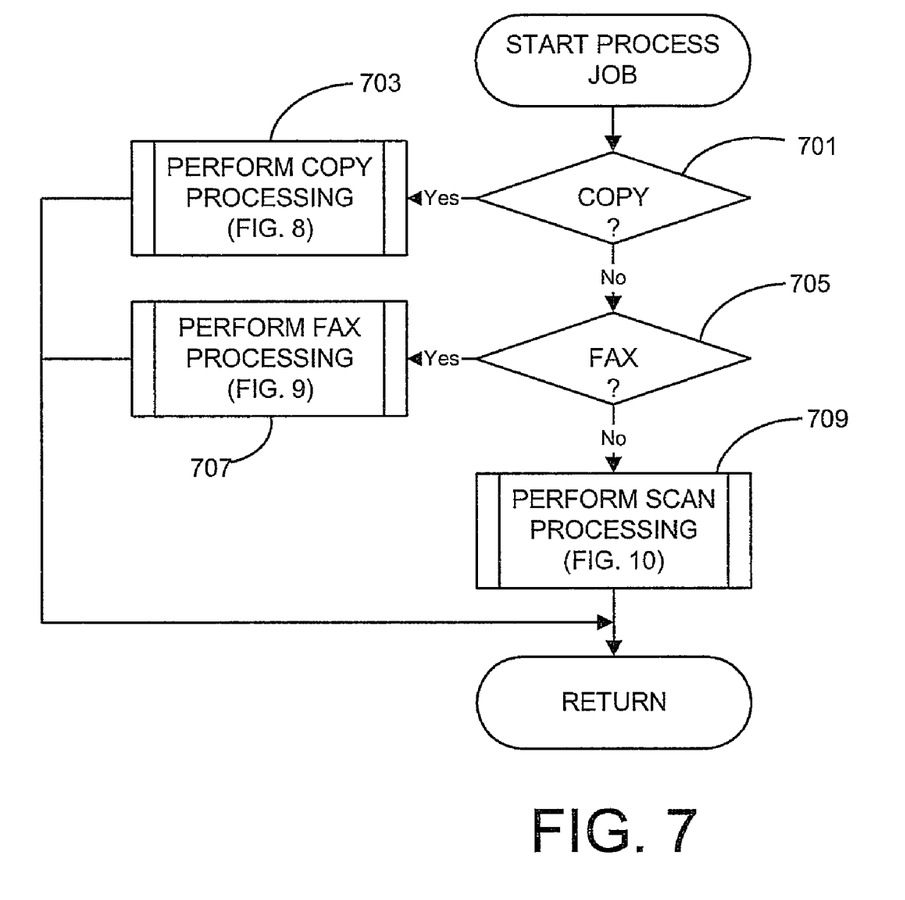
FIG. 7 is a flow chart of an embodiment of job processing according to the present invention.

FIG. 7 is a flow chart of job processing according to an embodiment of the present invention. The multifunction determines, at decision block 701, if the operation to be performed on the document covered by the cover sheet is copy. If so, the multifunction printer performs copy processing, as indicated generally at block 703 and described in detail with reference to FIG. 8. If the operation to be performed is not copy, the multifunction printer determines, at decision block 705, if the operation is fax. If so, the multifunction printer performs fax processing, as indicated generally at block 707 and described in detail with reference to FIG. 9. If the operation to be performed is not fax, the multifunction printer performs a scan processing, as indicated generally at block 709, and described in detail with reference to FIG. 10. After performing a specified operation, processing returns to FIG. 6.

Figure 8:
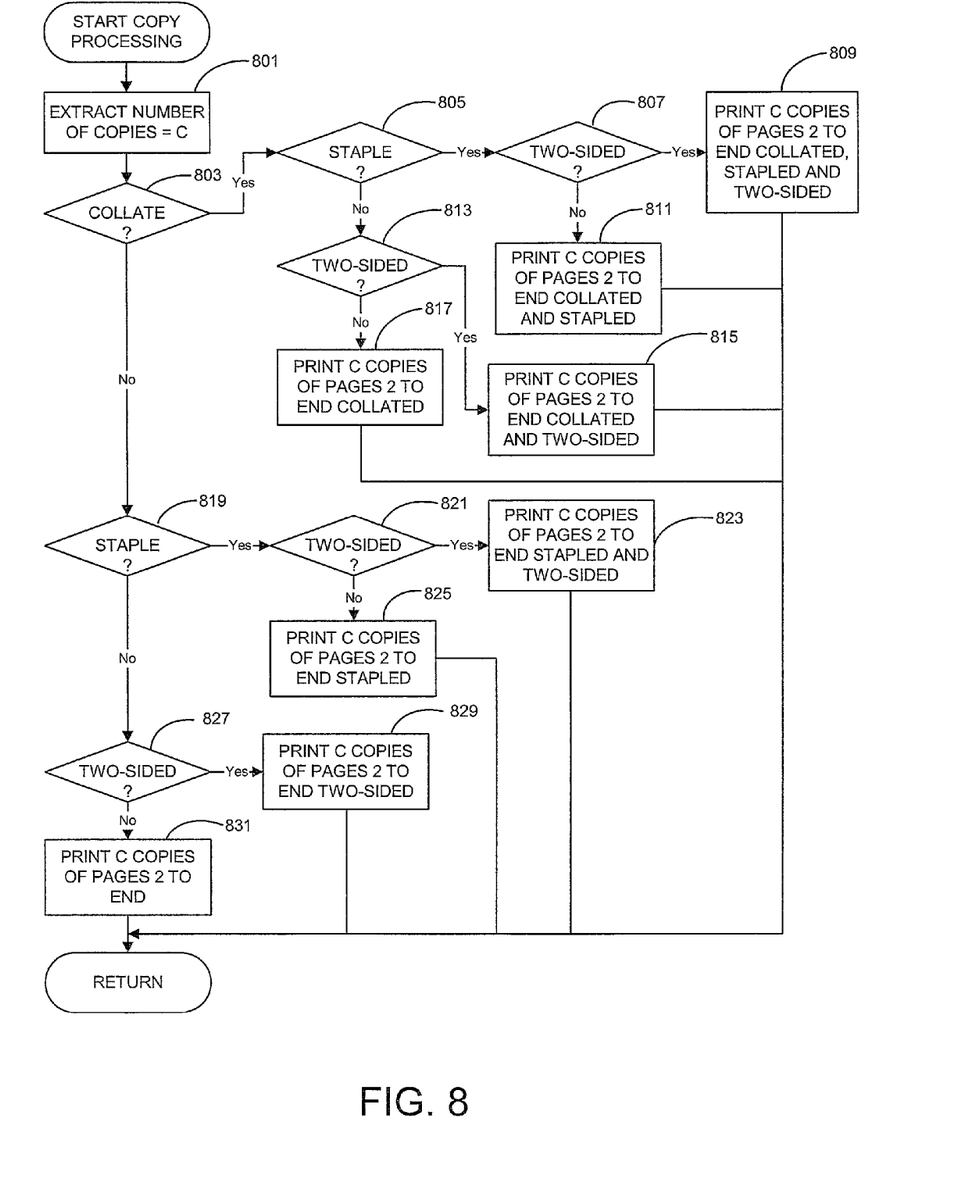
FIG. 8 is a flow chart of an embodiment of copy processing according to the present invention.

FIG. 8 is a flow chart of copy processing 703 of FIG. 7. The multifunction printer extracts from the cover sheet the number of copies C to be made, at block 801. The multifunction printer then determines from the cover sheet if the copies are to be collated, as indicated at decision block 803. If so, the multifunction printer determines, at decision block 805, if the copies are to be stapled. If so, the multifunction printer determines, at decision block 807, if two-sided copies are to be made. If so, the multifunction printer prints C copies of pages 2 to end, collated, stapled, and two-sided, as indicated at block 809. If, as determined at decision block 807, two-sided copying is not desired, the multifunction printer prints C copies of pages 2 to end, collated and stapled, as indicated at block 811. Referring back to decision block 805, if the collated copies are not to be stapled, the multifunction printer determines, at decision block 813, if the copies are to be two-sided. If so, the multifunction printer prints C copies of pages 2 to end, collated and two-sided, as indicated at block 815. If, as determined at decision block 813, the copies are not to be two-sided, the multi-function printer prints C copies of pages 2 to end collated, as indicated at block 817. After completing a YES branch off decision block 803, processing returns to FIG. 7.

If, as determined at decision block 803, the copies are not to be collated, the multifunction printer determines, at decision block 819, if the copies are to be stapled. If so, the multifunction printer determines, at decision block 821, if the copies are to be two-sided. If so, the multifunction printer prints C copies of pages 2 to end, stapled and two-sided, as indicated at block 823. If not, the multifunction printer prints C copies of pages 2 to end, stapled, as indicated at block 825. If, as determined at decision block 819, the copies are not to be stapled, the multifunction printer determines, at decision block 827, if the copies are to be two-sided. If so, the multi-function printer prints C copies of pages 2 to end, two-sided, as indicated at block 733. If not, the multifunction printer prints C copies of pages 2 to end.

Figure 9:
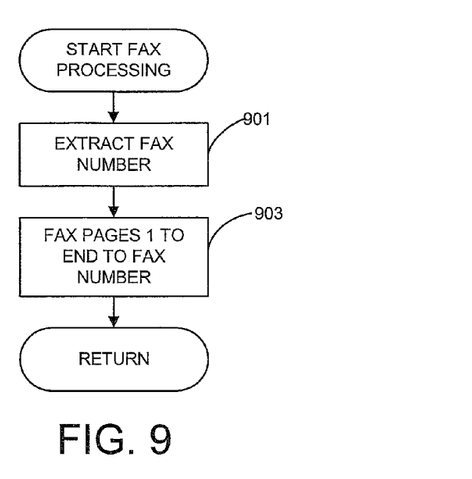
FIG. 9 is a flow chart of an embodiment of fax processing according to the present invention.

FIG. 9 is a flow chart of fax processing 707 of FIG. 7. The multifunction printer extracts from the cover sheet the receiving fax number, at block 901. Then, the multifunction printer faxes pages 1 to end to the fax number, as indicated at block 903. The multifunction printer may include logic or intelligence that enables it to determine whether the receiving fax number is local, domestic, or international, and a dial the number accordingly. Alternatively, the multifunction printer may be programmed simply to dial the fax number extracted from the cover sheet. In that case, the person preparing the cover sheet would have to enter all digits necessary to complete the call. After faxing the document to receiving fax number, processing returns to FIG. 7.

Figure 10:
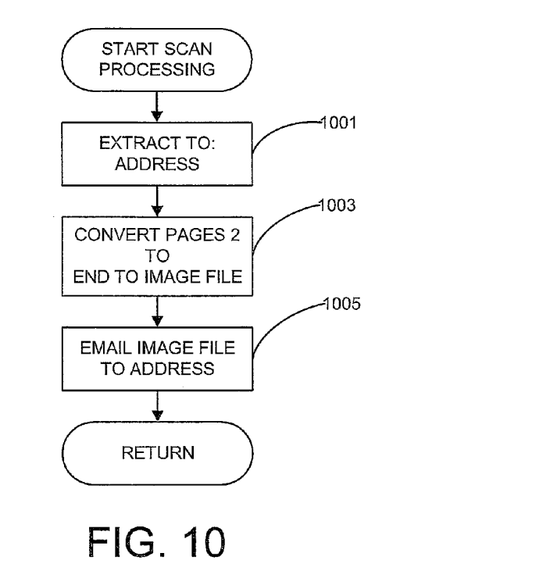
FIG. 10 is a flow chart of an embodiment of scan processing according to the present invention; and, FIG. 11 is a flow chart of an embodiment of document flagging according to the present invention.

FIG. 10 is a flow chart of an embodiment of scan processing 709 of FIG. 7. The multifunction printer extracts from the cover sheet the e-mail address of the recipient, at block 1001. Then, the multifunction printer converts pages 2 to end to an image file, as indicated at block 1003. Examples of image files include PDF and TIFF files. Then, the multifunction printer e-mails the image file to the extracted e-mail address, as indicated at block 1005, and processing returns to FIG. 7.

Figure 11:
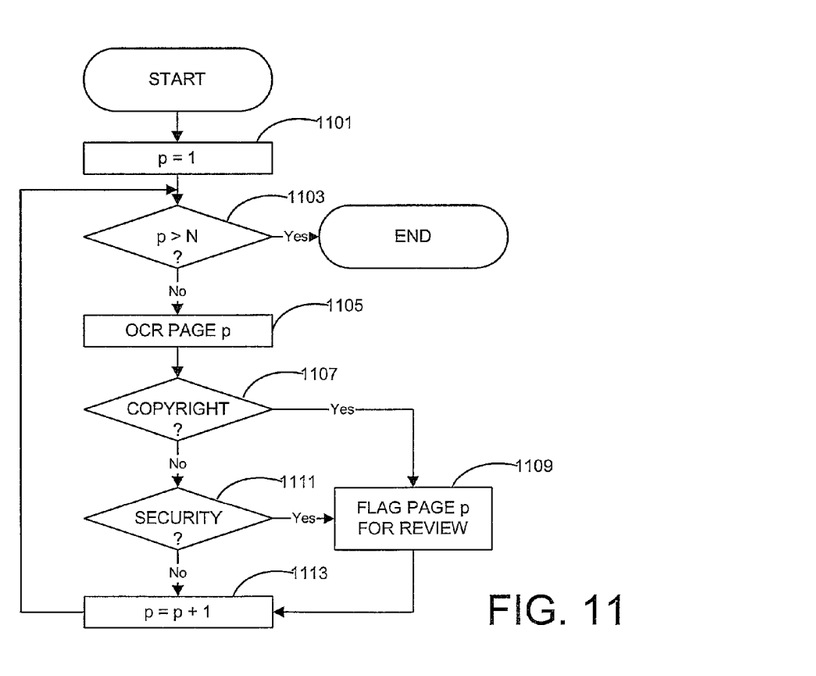

FIG. 11 illustrates a process that the multifunction printer may perform concurrently with processing according to FIG. 6. Processing according to FIG. 11 enables the multifunction printer to flag for review certain documents, the copying or transmission of which could subject the individual or the organization to liability or result in publication of proprietary information. The multifunction printer sets an index p equal to one, at block 1101. Then, the multifunction printer tests, at decision block 1103, if p is greater than N. If so, processing ends. If not, the multifunction printer performs OCR on page p, at block 1105. Then, the multifunction printer determines, at decision block 1107, if page p contains a copyright notice. If so, the multifunction printer flags page p for review, at block 1109. The flag page may be stored in a review folder or e-mailed to a reviewer. Preferably, the identity of the individual that requested processing of the page is stored in association with the page. In certain embodiments, further processing of flag documents may be blocked until an authorization code, or the like, is entered. If, as determined at decision block 1111, page bears a security marking, the pages flagged for review, at block 1109. Then, the multifunction printer sets p=p+1, at block 1113, and processing returns to decision block 1103.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of processing a plurality of sheets of writing at a multifunction printer, the method comprising:
   scanning all of said sheets of writing;
   finding a cover sheet for a document in said scanned sheets of writing, said cover sheet having one or more of:
      an operation to be performed on said document; and
      additional processing instructions including instructions for performing one or more of: collating said document, stapling said document, and two-side printing said document;
   searching said scanned sheets of writing for flagging indicia, wherein said flagging indicia is one or more of a copyright notice or a security legend;
   in response to determining the presence of flagging indicia in one or more scanned sheets of said scanned sheets of writing, said multifunction printer:
      flagging one or more scanned sheets having flagging indicia from said one or more scanned sheets of writing;
      blocking processing of only said flagged one or more sheets from said one or more scanned sheets of writing, wherein access to said flagged one or more sheets is secured with an authorization code;
      identifying an individual that requested the processing of said document;
      storing an identity of said individual that requested the processing of said flagged one or more sheets in association with said flagged one or more sheets;
      transmitting only said flagged one or more sheets to an electronic mail address of a reviewer via an electronic mail; and
      in response to detecting said entry of said authorization code, removing said blocking of said flagged one or more sheets; and
   in response to said cover sheet having additional processing instructions, said multifunction printer performing said additional processing instructions on said document.

2. The method as claimed in claim 1, wherein finding said cover sheet comprises:
   performing optical character recognition on a first scanned sheet of writing; and
   searching said first scanned sheet of writing for cover sheet indicia.

3. The method as claimed in claim 2, wherein determining said operation to be performed on said document comprises: searching said first scanned sheet of writing for operation indicia.

4. The method as claimed in claim 1, wherein said operation to be performed on said document comprises at least one of:
   printing said document;
   creating an image of said document; and
   sending said image to a recipient.

5. The method as claimed in claim 4, wherein sending said image to said recipient comprises: searching said cover sheet for recipient indicia.

6. The method as claimed in claim 5, wherein said recipient indicia comprises at least one of:
   an email address; and
   a telephone number.

7. The method of claim 1, further comprising, saving said flagged one or more sheets to a review folder.

8. The method of claim 1, further comprising determining a number of pages in said document;
   identifying said operation and said additional processing instructions on said coversheet;
   said multifunction printer performing said operation indicated in said cover sheet on said document; and
   performing optical character recognition on said scanned sheets of writing.

9. A method of processing a plurality of hardcopy documents, the method comprising:
   placing a cover sheet on each of said documents;
   assembling said documents into a stack;
   a scanning component of a multifunction printer scanning said stack;
   searching said stack for flagging indicia, wherein said flagging indicia is one or more of a copyright notice or a security legend;
   in response to determining the presence of flagging indicia in one or more scanned sheets of said stack, said multifunction printer:
      flagging one or more scanned sheets having flagging indicia from said one or more scanned sheets of writing;
      blocking processing of only said flagged one or more sheets from said one or more scanned sheets of writing, wherein access to said flagged one or more sheets is secured with an authorization code;
      identifying an individual that requested the processing of said document;
      storing said identity of said individual that requested the processing of said flagged one or more sheets in association with said flagged one or more sheets;
      transmitting only said flagged one or more sheets to an electronic mail address of a reviewer via an electronic mail; and
      in response to detecting said entry of said authorization code, removing said blocking of said flagged one or more sheets; and
   said multifunction printer locally performing an operation on each of said documents in accordance with said cover sheets found within said stack and performing one or more of:
      collating said documents, stapling said documents, and two-side printing said documents based on additional processing instructions included on said cover sheet.

10. The method as claimed in claim 9, wherein said cover sheet includes cover sheet indicia, and operation indicia, said operation indicia indicating said operation to be performed on said document.

11. The method as claimed in claim 10, wherein performing optical character recognition comprises:

performing optical character recognition of a first cover sheet;

searching said first cover sheet for said operation indicia; and performing said operation indicated by said operation indicia.

12. The method as claimed in claim 9, further comprising processing a new document in response to finding a cover sheet.

13. The method of claim 9, further comprising saving said flagged one or more sheets to a review folder.

14. The method of claim 9, further comprising performing optical character recognition on said stack.

15. A system for performing automated batch processing on hard copy documents, said system comprising:

a sheet feeder;

a scanner arranged to receive sheets from said sheet feeder;

a processor coupled to said scanner;

a plurality of output devices coupled to said processor; and wherein said processor is configured to:

search said scanned sheets for flagging indicia, wherein said flagging indicia is one or more of a copyright notice or a security legend;

in response to determining the presence of flagging indicia in one or more of said scanned sheets:

flag one or more sheets having flagging indicia from said one or more scanned sheets of writing;

block processing of only said flagged one or more sheets from said one or more scanned sheets of writing, wherein access to said flagged one or more sheets is secured with an authorization code;

identify an individual that requested the processing of said document;

store an identity of said individual that requested the processing of said flagged one or more sheets in association with said flagged one or more sheets;

transmit only said flagged one or more sheets to an electronic mail address of a reviewer via an electronic mail; and in response to detecting said entry of said authorization code, remove said blocking of said flagged one or more sheets; and send documents to said output devices according to written information on said sheets scanned by said scanner, wherein said written information further includes additional processing instructions for causing said processor and said output devices to perform one or more functions from: collating said document, stapling said document, and two-side printing said document.

16. The system of claim 15, wherein said processor is further configured to:

determine a number of pages in said document;

identify said operation and said additional processing instructions on said coversheet;

control said system to perform said operation indicated in said cover sheet on said document; and in response to said cover sheet having additional processing instructions, control said system to perform said additional processing instructions on said document.

17. The system of claim 16, wherein said processor is further configured to:

perform optical character recognition on a first scanned sheet of writing; and search said first scanned sheet of writing for cover sheet indicia determine said operation to be performed on said document from said cover sheet, wherein said operation to be performed on said document comprises one or more of: the processor controlling said system to print said document, said processor creating an image of said document, said processor sending said image to a recipient.

18. The system of claim 17, wherein said processor sending said image to a recipient comprises said processor searching said cover sheet for recipient indicia, wherein said recipient indicia comprises one or more of an email address and a telephone number.

19. The system of claim 15, wherein said processor is further configured to save said flagged one or more sheets to a review folder.

20. The system of claim 15, wherein said processor is further configured to perform optical character recognition on sheets scanned by said scanner.

* * * * *